Sept. 10, 1968

J. J. KUIPERS ET AL 3,400,768

CUTTING MACHINE LOAD MONITOR CONTROL

Filed June 16, 1966

INVENTORS.
JOHN J. KUIPERS
MUSTAFA KEMAL OZCAN
BY Parker & Carter
Attorneys.

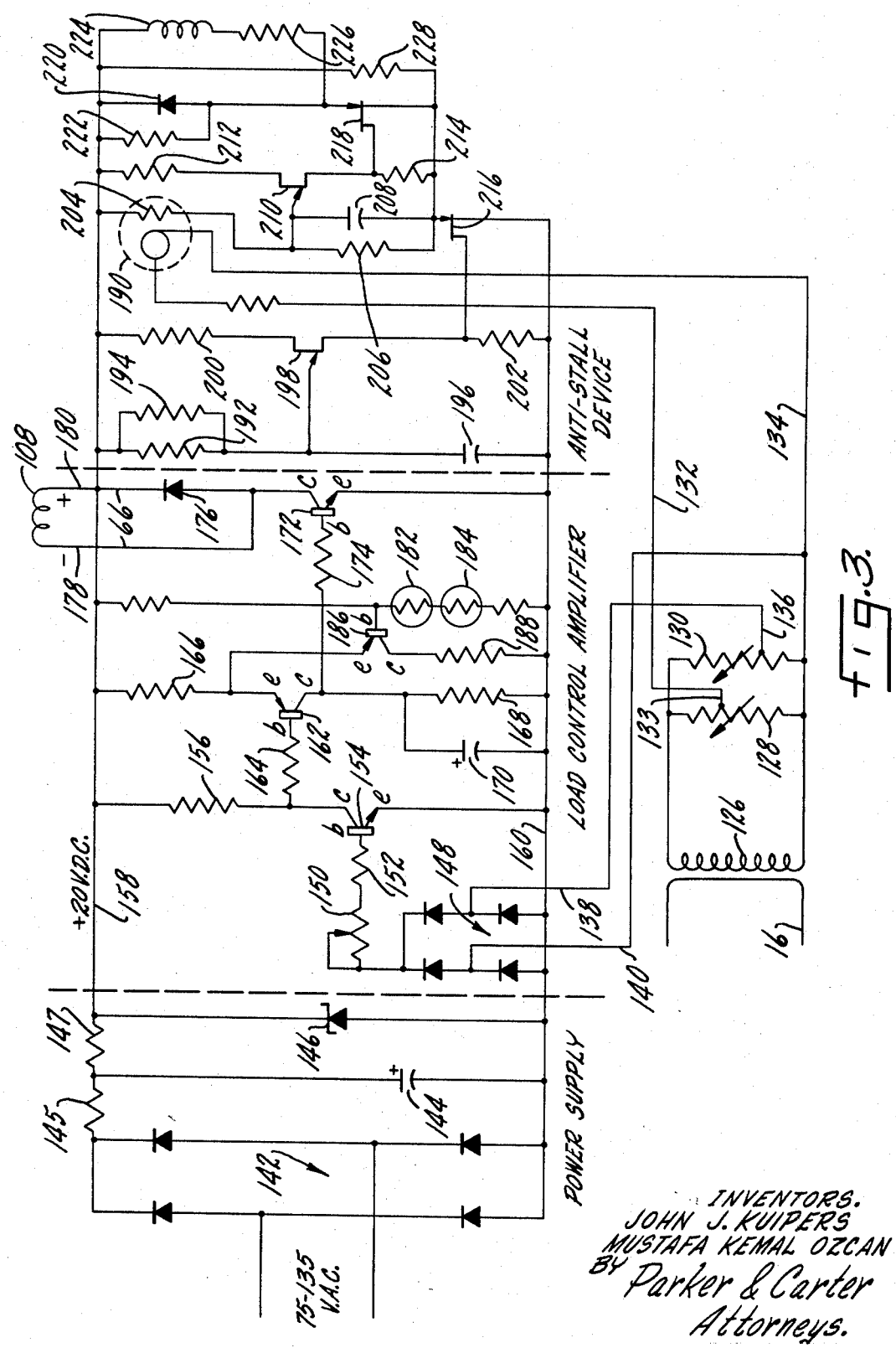

United States Patent Office 3,400,768
Patented Sept. 10, 1968

3,400,768
CUTTING MACHINE LOAD MONITOR CONTROL
John J. Kuipers, Palos Heights, and Mustafa Kemal Ozcan, Chicago, Ill., assignors to Westinghouse Air Brake Company, Pittsburgh, Pa., a corporation of Pennsylvania
Filed June 16, 1966, Ser. No. 557,970
16 Claims. (Cl. 173—1)

ABSTRACT OF THE DISCLOSURE

An automatic control for a cutting apparatus driven by electric power. The power used by the cutting apparatus is sensed by an electric circuit compared with a predetermined reference to control the rate of advance of the cutting member into the material to be cut.

This invention relates to a load monitor control for use with a cutting apparatus, and particularly to such a control which senses the power drawn by the cutter drive, with the power sensed being utilized to control the cutter advanced into the work.

One purpose of the invention is a load control of the type described which is arranged to sense the current in one phase of an electric motor driving the cutter, the sensed current being compared with a reference, and the mechanism advancing the cutter being controlled in accordance with the comparison.

Another purpose is a load monitor control circuit which continuously regulates a cutter advance so that the maximum amount of work can be done without overloading the cutter drive.

Another purpose is a load control circuit of the type described which is effective to regulate the cutter advance in accordance with the resistance met in the cutting operation so that the maximum or optimum amount of work can be done by the cutter, without overloading it.

Another purpose is a control device of the type described including means for preventing stalling of the cutting member.

Another purpose is a control circuit for a fluid operated cutter drive, which control circuit is regulated by the power drawn by the cutting motor.

Another purpose is a control circuit of the type described including temperature compensation means.

Another purpose is an improved reliably operable method of operating the combination of a cutting member drive and a cutting member advancing means.

Other purposes will appear in the ensuing specification, drawings and claims.

Figure 1:
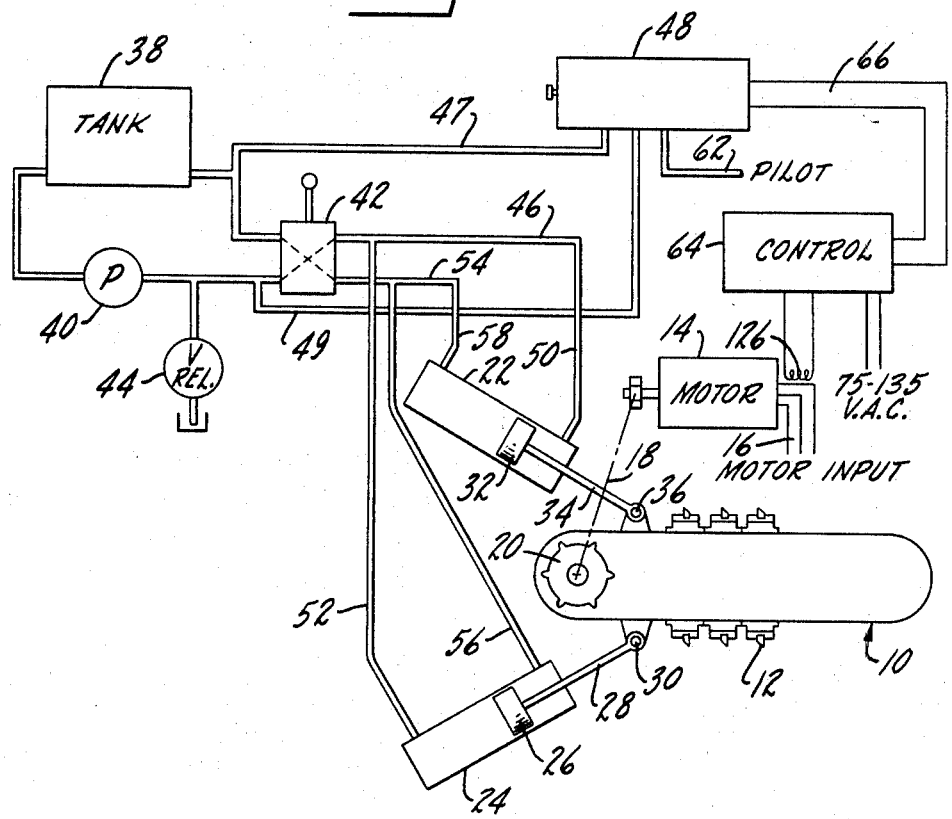
Figure 2:
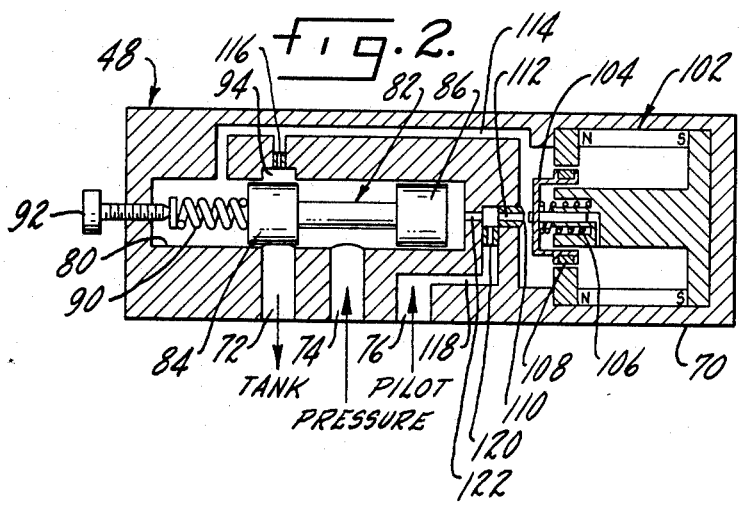

The invention is illustrated diagrammatically in the following drawings wherein:

FIGURE 1 is a diagrammatic illustration of a cutting apparatus of the type described, FIGURE 2 is a section through the bypass valve illustrated in FIGURE 1, and FIGURE 3 is an electrical schematic illustrating the control circuit used in the apparatus of FIGURE 1.

The invention will be described particularly in connection with a cutting apparatus of the type used in mining operations. Obviously the invention is not limited to this application and the overall design disclosed herein may have a variety of uses.

In FIGURE 1 a cutting member is indicated generally at 10 and may include a plurality of cutting teeth 12 which are hooked together to form a chain which continuously moves about the periphery of the cutting member 10. In effect, the member 10 is a large chain saw. For example, such saws may be as long as ten feet in length and may be used to cut into the face of the material to be mined, for example along the sides, bottom or top of an area prior to blasting. The cutting unit 10 may be mounted on a self-propelled vehicle, although obviously the invention is not limited to such an application. A motor 14 may receive three-phase alternating current from wires 16 and there may be a drive connection 18 between the motor and a sprocket or the like 20 on the cutter 10. The motor 14 is the drive for the cutter 10.

A pair of hydraulic piston and cylinder assemblies or rams 22 and 24 are used to control the movement of the cutter 10. Ram 24 may have a piston 26 and an outwardly extending piston rod 28 which is pivoted to the cutter 10, as at 30. In like manner, ram 22 may have a piston 32 and a piston rod 34 which is pivotally connected to the cutter 10 as at 36.

The rams 22 and 24 are controlled and driven by a fluid circuit which may include a tank 38 and a pump 40. A control valve 42 is arranged to control the direction of flow in the circuit and hence the direction through which the rams 22 and 24 will move the cutter 10. A relief valve 44 may be connected between valve 42 and pump 40 as is conventional. Line 47 forms a return between valve 48 and the tank and a line 49 may be the pressure line between valve 48 and pump 40. A line 46 may connect with a line 50 which is connected to one side of piston 32 and with a line 52 which is connected to the opposite side of piston 26. Obviously the rams 22 and 24 are arranged so that their pistons move in opposite directions to cause rotation or pivotal movement of the cutter 10. A line 54 is connected with line 56 which connects to one side of piston 26 and to line 58 which connects to one side of piston 32. The fluid circuit may be completed by a pilot line 62 which connects to the bypass valve 48 and which will normally be supplied with fluid at a relatively constant pressure, preferably from a separate source.

The schematic arrangement of FIGURE 1 is completed by an electrical control circuit indicated generally at 64, which will be described in detail hereinafter. The control circuit 64 is connected by lines 66 to the bypass valve 48 and by a current transformer to the input of the motor 14.

The bypass valve 48 is illustrated in FIGURE 2 and may include an outer housing 70 having ports 72, 74 and 76, with port 72 connecting to line 47, port 74 connecting to line 49, and port 76 opening into line 62. Within the housing 70 is an elongated chamber 80 containing a spool member 82. The spool 82 may have two enlarged areas or lands 84 and 86. The spool 82 may be biased to the right, as illustrated in FIGURE 2, by a spring or the like 90 which may be adjusted by a screw 92. There is an annular passage 94 formed about chamber 80 coinciding with the position of port 72.

At the right-hand end of the bypass valve 48 is a magnet indicated generally at 102 and an armature 104 biased outwardly by a spring 106. A coil 108 is fixed to the armature and the current through the coil will control the position of armature 104 relative to an orifice 110 which is at the mouth of a passage 112 communicating with chamber 80.

An axially extending passage 114 may connect that portion of the chamber 80 holding spring 90 with the area about the electromagnet at the opposite end of the valve. A passage of reduced diameter 116 connects passage 114 with the annular chamber 94. A second axially extending passage 118 connects port 76 with a passage of reduced area 120 which in turn leads into the opposite end of chamber 80. A restricted passage 122 completes the structure at the right-hand end of the chamber 80.

When the circuit of FIGURE 1 is operational, line 49 functions as the pressure line, and line 47 as the return. When the spool 82 of FIGURE 2 is in the position shown, there will be no fluid flowing through the valve 48 and the bypass is effectively closed. Spool 82 will be held in the position shown by the combined forces of the spring 90 and the fluid pressure supplied through pilot port 76. The relatively constant pressure supplied by pilot line 62 will flow through port 76, through passage 118, through restricted openings 120 and 122 to the right-hand side of land 86. Simultaneously fluid will be supplied through pressure reducing restricted passage 112 and axial passage 114 to the left-hand side of land 84. In effect, spool 82 is balanced on the right by the pressure against land 86 and on the left by the combined spring and fluid pressure against land 84.

In the event the control circuit 64, to be described hereinafter, senses a need to reduce the rate at which the cutter 10 is to advance into the work, the bypass valve opens to reduce the amount of fluid supplied to rams 22 and 24, hence retarding the advance of the cutter 10. Assuming for the moment that the power drawn by the motor 14 exceeds a reference level, as described hereinafter, current will flow in coil 108 which will tend to cause the armature 104 to close orifice 110. This action will reduce the amount of fluid flowing through passage 114 and hence reduce the force applied from the left to the spool 82. The spool will accordingly move to the left with the result that there will be a degree of communication between ports 72 and 74. Accordingly, a portion of the pressure fluid flowing toward valve 42 in line 49 will be bypassed through valve 48 with the amount of fluid which is bypassed being dependent upon the amount to which the spool 82 moves to the left.

The volume and pressure supplied the rams 22 and 24 determine the rate of advance of the cutter 10 into the material to be cut. The rate of fluid supplied to the rams is controlled by the position of spool 82 within the bypass valve 48. As will be described hereinafter, the position of the spool within the bypass valve is regulated by control circuit 64.

The motor 14 may be a three-phase motor and at the bottom of FIGURE 3 is a transformer coil 126 which is inductively coupled to one phase of the motor input. A pair of variable resistors 138 and 130 may be connected across the transformer 126. There may be two outputs from transformer coil 126. One output is taken between line 134 and tap 133 of resistor 128, and this output goes to that portion of the circuit designated as an anti-stall device. A second output may be taken between line 134 and the tap 136 of resistor 130. This latter output is conveyed by wires 138 and 140 to that portion of the circuit known as the load control amplifier.

The circuit of FIGURE 3 includes a section designated as a power supply and which has an input which may vary anywhere from 75 to 135 volts AC, but is normally 110 volts. A bridge rectifier indicated generally at 142 may be connected, through resistor 145, across a capacitor 144 which assists in removing the ripple from the AC input. A Zener diode 146 may be connected, through resistor 147, across the capacitor to provide voltage regulation. Approximately 20 volts DC is applied by the power supply section to the load control amplifier.

Lines 140 and 138 are connected to the terminals of a bridge rectifier indicated generally at 148 and which is effective to remove a substantial amount of the sinusoidal variation in voltage received from transformer 126. The output of rectifier 148 is fed through a pair of resistors 150 and 152 to the base of an NPN transistor 154. A resistor 156 connects the collector of transistor 154 to line 158, with the emitter of transistor 154 being connected directly to line 160. The second stage in the load control amplifier is formed by a PNP transistor 162 which has its base connected through a resistor 164 to the collector of transistor 154. A resistor 166 connects the emitter of transistor 162 to line 158 and a resistor 168 connects the collector of transistor 162 to line 160. A capacitor 170 may be in parallel with resistor 168 for damping of signal ripple.

The third stage of the amplifier may include transistor 172 whose base is connected through a resistor 174 to the collector of transistor 162. Transistor 172 may be an NPN transistor and has its collector connected through a diode 176 to line 158 and through line 180 to the control valve 48. Note particularly the top of FIGURE 3 in which there are wires 178 and 180, having the voltage polarities indicated, which are connected to the control valve 48. Lines 66 in FIGURE 1 are the same as lines 178 and 180 in FIGURE 3. The emitter of transistor 172 is connected directly to line 160.

It is desirable in a circuit of the type described to provide temperature compensation to prevent false operation of the amplifier stages, particularly the second stage. The second stage consisting of transistor 162 is quite temperature sensitive inasmuch as it is a PNP transistor. A pair of thermistors 182 and 184 are connected between the base of transistor 186 and line 160. One of the thermistors is physically placed on the exterior case of the second stage transistor 162 whereas the other thermistor is placed in ambient air. The emitter of transistor 186 is connected to resistor 166 and then to line 158. The collector of transistor 186 is connected through a resistor 188 to line 160.

The voltage developed across resistor 130 is a direct reflection of the current in one phase of the motor 14. Accordingly, the voltage developed at the output of bridge rectifier 148 will be a function of motor current and in the control signal for the circuit. When there is a sufficiently large voltage or control signal developed at the output of rectifier 148, transistor 154 will conduct. The operation of stage one of the load control amplifier or of transistor 154 will cause the second stage or transistor 162 to conduct. Both stages will actually be pulsed to some extent because of the rippled DC input. As soon as the second stage or transistor 162 begins to conduct, the third stage or transistor 172 will conduct. Capacitor 170 reduces, but does not eliminate, the ripple effect on the third stage. In practice there may be as much as 20 percent of the original voltage variation remaining. In fact, it is desirable to have a small amount of ripple voltage so that there will be some continuous movement of the spool 82 in the valve 48. In any event, there will be a voltage or resultant signal developed at the output of transistor 172 and this voltage will be applied across lines 178 and 180 to the control coil windings of valve 48. As discussed above, the valve spool will move in accordance with the current applied to the coil to regulate the hydraulic fluid supplied to the turning rams 22 and 24.

The load control amplifier has a temperature compensation circuit made up of transistor 186 and thermistors 182 and 184. When there is excessive heating, either of ambient temperature or of transistor 162, transistor 186 will conduct which will cause a voltage drop across resistor 166 which in turn will prevent transistor 162 from firing except when this firing is caused by the operation of stage one. The invention is not limited to this particular form of temperature compensation and there are many other suitable circuits which will perform similar functions.

Turning to that portion of FIGURE 3 designated "anti-stall device," the input from lines 132 and 134 is fed to a raysistor indicated generally at 190. The raysistor may include a lamp and a resistance and as the current through the lamp increases, the value of the resistance goes down. The anti-stall device circuit may include a pair of resistors 192 and 194, connected in parallel, with this combination being in series with a capacitor 196 across lines 158 and 160. A unijunction transistor 198 has its emitter connected to capacitor 196 with its opposite base terminals being connected through resistors 200 and 202 to lines 158 and 160. The resistive portion 204 of raysistor 190 is connected to a resistance 206 and a capacitance 208. The common terminals of resistance 206 and capacitance 208 are connected to the emitter of a unijunction transistor 210. The bases of transistor 210 are connected through resistances 212 and 214 to line 158 and to the anode of a silicon controlled rectifier 216. The cathode of SCR 216 is connected to line 160 with the gate of SCR 216 being connected to resistance 202. A second SCR 218 has its anode connected to a diode 220 and to a resistance 222. The cathode of SCR 218 is connected to one side of resistance 214 with the gate of SCR 218 being connected to the other side of resistance 214. A coil 224 is in series with a resistance 226 with the series combination being connected across diode 220. An additional resistance 228 is connected across the combination of diode 220 and SCR 218.

The anti-stall device is effective to prevent the motor from being stalled for excessive periods of time which would induce high heat. In effect, there is a motor cutoff for excessive currents in the motor. A timing device prevents operation of the motor cutoff during starting of the motor. When the circuit is initially started, in conjunction with motor start, there will be excessive current drawn by the motor and this will be reflected in raysistor 190. However, the circuit will not at that initial time be set for motor cutoff. As soon as capacitor 196 has charged, with this time being controlled by the combination of resistors 192 and 194, UJT 198 will break down and conduct with the result that the gate of SCR 216 will have a sufficient voltage on it to place the SCR in a conducting condition. The circuit is now in a tripping or motor shutoff condition. If at a future time there is excessive current drawn by the motor, this will be reflected in the resistance 204 of raysistor 190 being substantially decreased. When the value of resistance 204 goes down, resistance 206 has a larger voltage drop across it with the result that UJT 210 breaks down and conducts. When UJT 210 conducts there is a sufficient voltage applied to the gate of SCR 218 to cause it to conduct. Thereafter, current will flow to coil 224, which coil is conventionally connected in a manner to shut off motor current or the supply to the motor.

The use, operation and function of the invention are as follows:

When the invention is utilized in a mining operation, the cutter 10 may be used to make cuts along the bottom, top or sides of a mine face which will be subsequently blasted. Assuming the mining operation involves coal, there may be portions of the area to be cut which will be all coal and there may be other small portions which are rock or some other material harder than coal. Normally the cutter 10 will be driven by the motor 14 at the maximum speed possible, consistent with the size of the motor, to provide maximum output. As the cutter is moving into relatively soft coal, the rams 22 and 24 will advance the cutter at a rate so that there will be no overloading of the motor. If the cutter encounters rock or some other material having a different cutting resistance, the control would change the feed rate to maintain constant motor current. The present invention provides a means whereby the combination of the cutter drive motor and the cutter advance drive cooperate to obtain the maximum output consistent with motor specifications. In the event greater cutting resistance is met, the speed of the cutter advance must be reduced so that the current drawn by the motor will not be excessive.

As disclosed herein, there is a means for sensing motor current and comparing motor current, which is indicative of the power being drawn by the motor and motor torque, against a reference. The reference, which may be the breakover point of transistor 154, will be set to provide the maximum possible output consistent with the motor current specifications. When the motor current exceeds the reference, the circuit described above will operate so as to supply a given amount of current to the coil 108 in the bypass valve. The current supplied to the bypass valve will cause it to open an amount sufficient to cut down the fluid supplied to the rams and hence slow the cutter advance. As soon as less resistance is again encountered by the cutter, the rams will receive an increased amount of fluid and the cutter will advance in the normal manner.

It is important to note that the current drawn by the motor is continually sensed and is continually compared against a reference. The flow to the cutter advance fluid drive is continually regulated. There is no stopping of the cutter advance when there is an overload, but rather the cutter advance is slowed down an amount consistent with the resistance being met by the cutting operation.

It is desirable for the spool 82 in the bypass valve to be continuously moving so as to prevent the spool from sticking. For this reason a portion of the ripple supplied to the load control amplifier from transformer 126 is not removed, but is kept in the voltage applied to the amplifier so that the amplifier will be generally continuously operated and will provide a small variation in voltage to coil 108. In this way, the spool will oscillate at a frequency consistent with the frequency of the power supplied to motor 14, but at a very reduced amplitude.

In addition to controlling the amount of fluid supplied to the rams to regulate the cutter advance, the present invention also includes an anti-stall device. Normally when a cutter is started, motor current will be excessive, but this current will drop down to normal in a matter of a few seconds. The present anti-stall device permits motor overload for the starting period, but is effective to cut out the entire motor operation in the event an excessive overload occurs after motor starting.

The present invention is directed broadly to a control circuit and should not be limited to any particular form of load control amplifier. What is important is to provide a means for sensing motor current, a means for comparing the sensed current with a reference, and a means for continuously controlling cutter advance in accordance with any difference between the sensed current and the reference.

In like manner, the invention should not be limited to any particular means for advancing the cutter. In some applications the cutter may be fluid-operated, whereas in other situations there may be other forms of drive.

Obviously the invention should not be limited to any particular form of bypass valve as there are many valves which can operate to control the amount of fluid passed through the valve in accordance with electrical current supplied to it.

The load control amplifier may have a bridge input as shown, or there may be a raysistor or thermistor input.

The invention is broadly applicable to many different types of cutting devices and should not be limited to the particular type of cutter shown herein or to any particular use of such a cutter. For example, we have applied the same electrical and mechanical circuitry to borers and rotating cutters.

Whereas the preferred form of the invention has been shown and described herein, it should be realized that there are many modifications, substitutions and alterations thereto within the scope of the following claims.

We claim:

1. In an automatic monitor control for a cutting apparatus having a cutting member and an electric power drive for operating said cutting member, the combination including:
   first means for advancing said cutting member into working relation with the material to be cut,
   sensing means for indirectly sensing the electric power used by said cutting member drive to produce a control signal varying as a function of said electric power,
   and control means for continuously comparing the control signal with a predetermined reference to maintain the power used by said cutting member drive at a predetermined level including means for reducing the power to said advancing means when the control signal exceeds the reference.

2. The structure of claim 1 further characterized in that said cutting member drive is an electric motor, said sensing means being arranged to produce the signal as a function of the current drawn by the motor.

3. The structure of claim 2 further characterized in that said sensing means includes a transformer in circuit with a winding of said electric motor producing said control signal proportional to current in said winding.

4. The structure of claim 1 further characterized in that said first means includes a fluid-operated drive and a fluid circuit for energizing said drive.

5. The structure of claim 4 further characterized in that the means for reducing the power to said first means includes a fluid bypass in circuit with said fluid drive.

6. The structure of claim 5 further characterized in that said fluid bypass includes electrically controlled valve means operating responsive to the control signal exceeding the reference.

7. The structure of claim 1 further characterized in that said cutting member drive is an electric motor, said sensing means including means for inductively sensing the current drawn by said motor to produce the signal, said first means including a fluid drive and a fluid circuit for energizing said drive, and said control means includes electrically operated servomotor means for regulating the amount of fluid supplied to said fluid drive responsive to said control signal.

8. The structure of claim 7 further characterized in that said control means includes at least one signal amplifying means, normally in a cut-off condition, and operable to conduct and produce a resultant signal responsive to the control signal exceeding the reference, said servomotor operating responsive to the resultant signal.

9. The structure of claim 7 further characterized in that said servomotor includes an electrically-operated bypass valve in circuit with said fluid drive, said bypass valve being operable to vent the fluid drive responsive to the control signal exceeding the reference.

10. The structure of claim 9 further characterized in that said bypass valve includes a body having a vent and a spool movable within said body between a first position closing the vent and a second position opening the vent, fluid motor means normally operating to move the spool to its first position, the motor means further operating to move the spool to its second position responsive to the control signal exceeding the reference.

11. The structure of claim 8 further characterized in that the amplifying means includes at least one semiconductor means connected for firing responsive to the control signal, and circuit means to produce the resultant signal responsive to said firing.

12. The structure of claim 1 further characterized by and including automatic cutoff means to reduce power to the cutting member drive responsive to a predetermined overload current in the motor.

13. The structure of claim 12 further characterized by and including delay means in circuit with said automatic cutoff means to prevent said cutoff means from operating during initial starting of said motor.

14. In an automatic monitor control for a cutting apparatus having a movable cutting member and an electric motor for driving said cutting member, the combination including:

fluid circuit means including a fluid drive for advancing said cutting member into working relation with the material to be cut and a bypass valve operable to regulate said advancing of the cutting member, means for continuously and inductively sensing the current drawn by said motor to produce a control signal current having a low value relative to the motor current, electric circuit means for continuously comparing the control signal current with a reference, said bypass valve including a coil connected to said electric circuit means, with current through said coil controlling the operation of said bypass valve, said bypass valve being arranged to control the amount of fluid supplied to said fluid drive such that the current drawn by said motor is regulated at a predetermined level.

15. A method of controlling the operation of a movable cutting member including the steps of continuously and inductively producing a control signal by sensing the current drawn by an electric cutting member including the steps of continuously and inductively producing a control signal by sensing the current drawn by an electric cutting member drive, producing a resultant signal by continuously comparing the control signal with a reference, and continuously regulating a drive that advances the cutting member into working relation with the material to be cut in accordance with the resultant signal from said comparison so that the current drawn by the cutting member electric drive is maintained at a predetermined level.

16. The method of claim 15 further characterized in that said advancing drive is fluid-operated, with said regulating step being performed by controlling the amount of fluid supplied to said advancing drive.

References Cited

UNITED STATES PATENTS

| 2,136,921 | 11/1938 | Joy _____ 173—7 X |
| 2,318,622 | 5/1943 | Paget _____ 173—7 |
| 2,334,009 | 11/1943 | Jeffrey _____ 299—1 |
| 3,107,903 | 10/1963 | Newton _____ 173—7 |

ERNEST R. PURSER, *Primary Examiner.*